Figure 1:
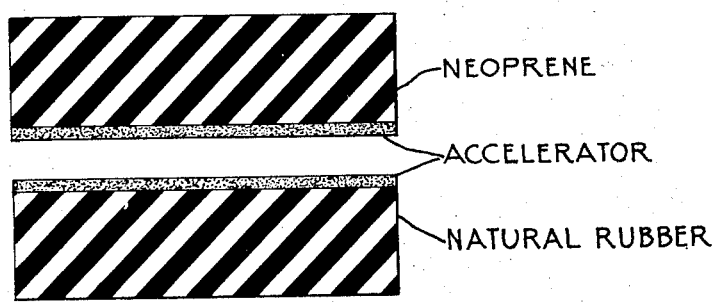

Bernard James Habgood INVENTOR.

BY Mark H. Clayton

ATTORNEY

Patented Nov. 22, 1938

2,137,686

UNITED STATES PATENT OFFICE 2,137,686

NEW RUBBER ARTICLE AND MATERIAL AND THE MANUFACTURE THEREOF

Bernard James Habgood, Blackley, Manchester, England, assignor to Imperial Chemical Industries Limited, a corporation of Great Britain Application December 10, 1936, Serial No. 115,265
In Great Britain December 13, 1935

16 Claims. (Cl. 18—59)

This invention relates to new composite rubber articles and materials comprising vulcanized natural rubber bonded to a vulcanized synthetic rubber-like material made by polymerizing halogen-substituted butadiene. It also relates to the manufacture of the said composite rubber articles and materials.

The aforesaid synthetic rubber-like materials, particularly those made by complete or partial polymerization of 2-chlorobutadiene (1:3) for instance as described in U. S. specification No. 1,950,432, and known to the trade as Neoprene, have certain advantages over natural rubber. For instance, they have greater resistance to oils and solvents and also to ozone, and they do not show that development of minute superficial cracks on exposure to light which is known as "sun-checking".

Hitherto it has been impossible to obtain satisfactory bonded composite rubber articles and materials of the kind mentioned.

I have now found that they can be obtained by taking unvulcanized compounded natural rubber and unvulcanized compounded synthetic rubber-like material of the kind mentioned, along with an interposed bonding agent which comprises a natural rubber vulcanization accelerator, which is an organic compound containing both nitrogen and sulfur, bringing the materials into good contact and then vulcanizing.

The advantage of being able to make such composite articles, and materials will be readily apparent to those skilled in the art of fabricating rubber articles and materials since articles and materials can be made in which only part or parts are made of natural rubber and in which only part or parts of the synthetic rubber-like material. For instance, in the manufacture of motor car tyre covers, the disadvantages of insufficient resistance to oils and sun-checking can now be overcome by making the outer layer of the cover of the synthetic rubber-like material and the remaining rubber portions of the cover of natural rubber. As another instance in the manufacture of rollers for printing, these can now be made with an outer cover of the synthetic rubber-like material, bonded to a core of natural rubber, so that the outer parts which are liable to come into contact with printing and machine oils will be oil-resistant.

As natural rubber vulcanization accelerators we use those accelerators which are organic compounds containing both nitrogen and sulfur, for example, mercaptoarylenethiazoles, dithiocarbamates and thiuram disulfides. Mixtures of accelerators may be used if desired. These accelerators will generally be solid and so can be applied alone to the surfaces to be bonded, as fine powders by dusting or spraying, care being taken that the accelerator is applied over the whole of the surfaces to be bonded. Application as a powder however is not always convenient, because, for instance, under some conditions the powder may not adhere. For this and other reasons it is for some purposes more convenient for the accelerator to be employed in conjunction with non-deleterious carriers which are fluid under the conditions of bonding. One convenient carrier is petroleum jelly. This carrier can be mixed with the accelerator in sufficient quantity to yield a mixture which will spread easily. Another convenient carrier is benzene. This carrier can be used, for instance, as a solvent for the accelerator (where the accelerator is soluble in benzene) and the resulting solution then painted on the surfaces to be bonded. A very convenient carrier is compounded natural rubber; this has the advantage that it can be sheeted out and the sheet applied in between the parts to be bonded. The compounded natural rubber must of course, contain a higher percentage of the accelerator than would be necessary for its normal cure, although in some cases as little as about twice the usual percentage is sufficient. The carrier may also consist of natural rubber along with the synthetic rubber-like material.

An object of my invention is the provision of a process for the manufacture of composite rubber articles and materials comprising vulcanized natural rubber bonded to a vulcanized synthetic rubber-like material made by polymerizing halogen-substituted butadiene, including 2-chlorobutadiene (1:3), which comprises taking unvulcanized compounded natural rubber and unvulcanized compounded synthetic rubber-like material made by polymerizing halogen-substituted butadiene, along with an interposed bonding agent which comprises a natural rubber vulcanization accelerator, which is an organic compound containing both nitrogen and sulfur, bringing the materials into good contact and then vulcanizing.

A further object of my invention is the provision of a process for the manufacture of rubber articles and materials referred to in the preceding paragraph, which process comprises taking unvulcanized compounded natural rubber and unvulcanized compounded synthetic rubber-like material made by polymerizing halogen substituted butadiene, including 2-chlorobutadiene (1:3), along with an interposed bonding agent which comprises a natural rubber vulcanization accelerator which is an organic compound containing both nitrogen and sulfur, and a non-deleterious carrier for the accelerator, the carrier being fluid under the conditions of bonding, bringing the materials into good contact and then vulcanizing.

A further object of my invention is the provision of composite rubber articles and materials comprising vulcanized natural rubber bonded to a vulcanized synthetic rubber-like material made by polymerizing halogen-substituted butadiene, including 2-chlorobutadiene (1:3).

A still further object of my invention is the provision of composite rubber articles and materials comprising vulcanized synthetic rubber-like materials made by polymerizing halogen-substituted butadiene, including 2-chlorobutadiene (1:3), in which the bond has been effected by interposing between the unvulcanized compounded materials before bonding, a bonding agent which comprises a natural rubber vulcanization accelerator which is an organic compound containing both nitrogen and sulfur, bringing the materials into good contact and then vulcanizing.

Figure 2:
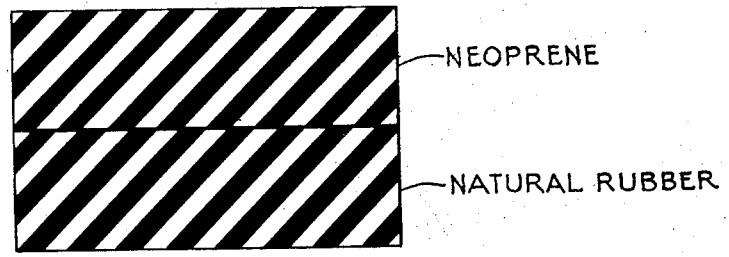

In order that the invention may be better understood, reference is made to the accompanying drawing in which Figure 1 represents a piece of uncured compounded natural rubber and a piece of uncured compounded neoprene to each of which an accelerator has been applied preparatory to bonding the two together. Figure 2 represents the same two pieces of material after the surfaces with the accelerator on them have been brought together and the whole cured. In Figure 1, the thickness of the accelerator shown is not in proportion to the thickness of the rubber and the neoprene as actually used. It has been made larger in order to better illustrate the invention.

The following examples in which parts are by weight illustrate but do not limit the invention.

*Example 1.*—Two mixes are made as follows:—

Natural rubber mix

| | Parts |
|---|---|
| Pale crepe rubber | 100 |
| Zinc oxide | 51.5 |
| Mercaptobenzthiazole | 0.8 |
| Stearic acid | 0.3 |
| Pine tar | 2.5 |
| Sulfur | 2.5 |

Synthetic rubber-like material mix

| | Parts |
|---|---|
| Neoprene | 100 |
| Light calcined magnesia | 10 |
| Zinc oxide | 5 |
| Wood rosin | 5 |

The two mixes are sheeted out and the surfaces, which are to be bonded, dusted with zinc dibutyldithiocarbamate powder, about ½ oz. being applied to the square yard. The two surfaces are then laid together and cured (i. e. vulcanized) in a press for 45 minutes at 141° C. The synthetic rubber and the natural rubber cannot then be separated without tearing one of them.

*Example 2.*—Two mixes are made as follows:—

Natural rubber mix

| | Parts |
|---|---|
| Smoked sheet rubber | 100 |
| Zinc oxide | 10 |
| Blanc fixe | 75 |
| Stearic acid | 1 |
| Sulfur | 3 |
| Zinc dimethyldithiocarbamate | 0.4 |

Synthetic rubber-like material tire tread mix

| | Parts |
|---|---|
| Synthetic rubber-like material made by polymerizing 2-chloro-butadiene (1:3) | 100 |
| Carbon black | 35 |
| Zinc oxide | 10 |
| Light calcined magnesia | 10 |
| Wood rosin | 5 |
| Cotton seed oil | 3 |
| Phenyl-β-naphthylamine | 2 |

The two mixes are sheeted out and the surfaces, which are to be bonded, smeared with a paste consisting of a mixture of equal parts of zinc diethyldithiocarbamate and petroleum jelly. The sheets are then treated as in Example 1 and a similar good bond is obtained.

*Example 3.*—The mixes of Example 1 are sheeted and painted with a cement made up of 10 parts of zinc diethyldithiocarbamate, 10 parts of neoprene, and 80 parts of benzene and press-cured at 141° C. for 45 minutes. A good bond is obtained similar to that obtained in Example 1.

*Example 4.*—The synthetic rubber mix of Example 1 and the natural rubber mix of Example 2 are sheeted out, dusted with tetramethylthiuram disulfide, laid together and cured for 45 minutes at 130° C. A good bond is obtained.

*Example 5.*—This is as Example 4, but cadmium or lead piperidyldithiocarbamate or zinc phenylethyldithiocarbamate or zinc pentamethylene dithiocarbamate is used as the accelerator and vulcanizing is done at 141° C. for 45 minutes. Good bonds are obtained.

*Example 6.*—This is as Example 4 but lead mercaptobenzthiazole is used as the accelerator and vulcanization is for 30 minutes at 153° C. A good bond is obtained.

*Example 7.*—Three mixes are made up as follows:—

Natural rubber tire tread mix

| | Parts |
|---|---|
| Smoked sheet rubber | 100 |
| Zinc oxide | 5 |
| Carbon black | 40 |
| Stearic acid | 4 |
| Sulfur | 3 |
| Mercaptobenzthiazole | 0.75 |

Synthetic rubber-like material tire tread mix

| | Parts |
|---|---|
| Polymerization product of 2-chlorobutadiene (1:3) made according to U. S. Specification No. 1,950,432 | 100 |
| Light calcined magnesia | 10 |
| Wood rosin | 5 |
| Carbon black | 35 |
| Pine tar | 3 |
| Stearic acid | 2 |
| Phenyl-α-naphthylamine | 2 |
| Sulfur | 1 |
| Zinc oxide | 10 |

Bonding mix

| | Parts |
|---|---|
| Natural pale crepe rubber | 100 |
| Zinc oxide | 10 |
| Blanc fixe | 75 |
| Stearic acid | 1 |
| 2:4-Dinitrophenyl benzthiazyl sulfide | 2 |
| Sulfur | 2 |

The three mixes are calendered into sheets and after moistening the four surfaces with solvent naphtha are laid together and vulcanized in a press for 45 minutes at 141° C. A good bond is obtained.

*Example 8.*—A synthetic rubber-like material tire tread mix of the same composition as that in Example 7 and a natural rubber tire tread mix of the same composition as that described in Example 2 are made up. A bonding mix of the following composition is also made up.

| | Parts |
|---|---|
| Natural crepe rubber | 100 |
| Zinc oxide | 10 |
| Blanc fixe | 75 |
| Stearic acid | 1 |
| Tetramethylthiuram disulphide | 2 |
| Sulfur | 2 |

These mixes are treated as described in Example 7. A good bond is obtained.

It is apparent that many widely different embodiments of this invention may be made without departing from the spirit and scope thereof and, therefore, it is not intended to be limited except as indicated in the appended claims.

I claim:

1. Process for the manufacture of composite rubber articles and materials comprising vulcanized natural rubber bonded to a vulcanized synthetic rubber-like material made by polymerizing halogen-substituted butadiene, which comprises taking unvulcanized compounded natural rubber and unvulcanized compounded synthetic rubber-like material made by polymerizing halogen-substituted butadiene, along with an interposed bonding agent which comprises a natural rubber vulcanization accelerator which is an organic compound containing both nitrogen and sulfur, bringing the materials into good contact and then vulcanizing.

2. Process for the manufacture of composite rubber articles and materials comprising vulcanized natural rubber bonded to a vulcanized synthetic rubber-like material made by polymerizing halogen-substituted butadiene, which comprises taking unvulcanized compounded natural rubber and unvulcanized compounded synthetic rubber-like material made by polymerizing halogen-substituted butadiene along with an interposed bonding agent which comprises a natural rubber vulcanization accelerator which is an organic compound containing both nitrogen and sulfur, and a non-deleterious carrier for the accelerator, the carrier being fluid under the conditions of bonding, bringing the materials into good contact and then vulcanizing.

3. Process for the manufacture of composite rubber articles and materials comprising vulcanized natural rubber bonded to a vulcanized synthetic rubber-like material made by polymerizing halogen-substituted butadiene, which comprises taking unvulcanized compounded natural rubber and unvulcanized compounded synthetic rubber-like material made by polymerizing halogen-substituted butadiene along with an interposed bonding agent which consists of a natural rubber vulcanization accelerator, which is an organic compound containing both nitrogen and sulfur and compounded natural rubber, the accelerator being present in quantity in excess of that necessary for the curing of the compounded natural rubber used in bonding, bringing the materials into good contact and then vulcanizing.

4. Process for the manufacture of composite rubber articles and materials comprising vulcanized natural rubber bonded to a vulcanized synthetic rubber-like material made by polymerizing 2-chlorobutadiene (1:3), which comprises taking unvulcanized compounded natural rubber and unvulcanized compounded synthetic rubber-like material made by polymerizing 2-chlorobutadiene (1:3) along with an interposed bonding agent which comprises a natural rubber vulcanization accelerator, which is an organic compound containing both nitrogen and sulfur, bringing the materials into good contact, and then vulcanizing.

5. Process for the manufacture of composite rubber articles and materials comprising vulcanized natural rubber bonded to a vulcanized synthetic rubber-like material made by polymerizing 2-chlorobutadiene (1:3), which comprises taking unvulcanized compounded natural rubber and unvulcanized compounded synthetic rubber-like material made by polymerizing 2-chlorobutadiene (1:3) along with an interposed bonding agent which comprises a natural rubber vulcanization accelerator, which is an organic compound containing both nitrogen and sulfur, and a non-deleterious carrier for the accelerator, the carrier being fluid under the conditions of bonding, bringing the materials into good contact and then vulcanizing.

6. Process for the manufacture of composite rubber articles and materials comprising vulcanized natural rubber bonded to a vulcanized synthetic rubber-like material made by polymerizing 2-chlorobutadiene (1:3), which comprises taking unvulcanized compounded natural rubber and unvulcanized compounded synthetic rubber-like material made by polymerizing 2-chlorobutadiene (1:3) along with an interposed bonding agent which consists of a natural rubber vulcanization accelerator, which is an organic compound containing both nitrogen and sulfur and compounded natural rubber, the accelerator being present in quantity in excess of that necessary for the curing of the compounded natural rubber, bringing the materials into good contact and then vulcanizing.

7. Process as claimed in claim 1, in which the rubber vulcanization accelerator is a mercapto-arylenethiazole.

8. Process as claimed in claim 1 in which the rubber vulcanization accelerator is a dithiocarbamate.

9. Process as claimed in claim 1, in which the rubber vulcanization accelerator is a thiuram disulfide.

10. Process for the manufacture of composite rubber articles and materials comprising vulcanized natural rubber bonded to a vulcanized synthetic rubber-like material made by polymerizing 2-chlorobutadiene (1:3), which comprises taking unvulcanized compounded natural rubber and unvulcanized compounded synthetic rubber-like material made by polymerizing 2-chlorobutadiene (1:3) along with an interposed bonding agent, which consists in dusting the surfaces to be bonded with a dithiocarbamate, bringing the surfaces into good contact and curing.

11. Process for the manufacture of composite rubber articles and materials comprising vulcanized natural rubber bonded to a vulcanized synthetic rubber-like material made by polymerizing 2-chlorobutadiene (1:3), which comprises taking unvulcanized compounded natural rubber and unvulcanized compounded synthetic rubber-like material made by polymerizing 2-chlorobutadiene (1:3) along with an interposed bonding agent, which consists in coating the surfaces to be bonded with a mixture of dithiocarbamate and petroleum jelly, bringing the surfaces into good contact and curing.

12. Process for the manufacture of composite rubber articles and materials comprising vulcanized natural rubber bonded to a vulcanized synthetic rubber-like material made by polymerizing 2-chlorobutadiene (1:3) which comprises taking unvulcanized compounded natural rubber and unvulcanized compounded synthetic rubber-like material made by polymerizing 2-chlorobutadiene (1:3) along with an interposed bonding agent, which consists in coating the surfaces to be bonded with a cement made from benzene, a dithiocarbamate which is soluble in benzene, and synthetic rubber-like material made by polymerizing 2-chlorobutadiene (1:3), bringing the surfaces into good contact and curing.

13. Composite rubber articles and materials comprising vulcanized natural rubber bonded to a vulcanized synthetic rubber-like material made by polymerizing halogen-substituted butadiene so tightly that the synthetic rubber and the natural rubber can not be separated without tearing one of them.

14. Composite rubber articles and materials comprising vulcanized natural rubber bonded to a vulcanized synthetic rubber-like material, made by polymerizing 2-chlorobutadiene (1:3) so tightly that the synthetic rubber and the natural rubber can not be separated without tearing one of them.

15. Composite rubber articles and materials comprising vulcanized natural rubber bonded to a vulcanized synthetic rubber-like material made by polymerizing halogen-substituted butadiene, in which the bonding agent comprises a natural rubber vulcanization accelerator which is an organic compound containing both nitrogen and sulfur.

16. Composite rubber articles and materials comprising vulcanized natural rubber bonded to a vulcanized synthetic rubber-like material made by polymerizing 2-chlorobutadiene (1:3), in which the bonding agent comprises a natural rubber vulcanization accelerator which is an organic compound containing both nitrogen and sulfur.

BERNARD JAMES HABGOOD.